Nov. 29, 1955
R. N. ECK ET AL
2,725,513
PROTECTIVE SYSTEMS FOR DIRECT CURRENT MOTORS
Filed March 6, 1953
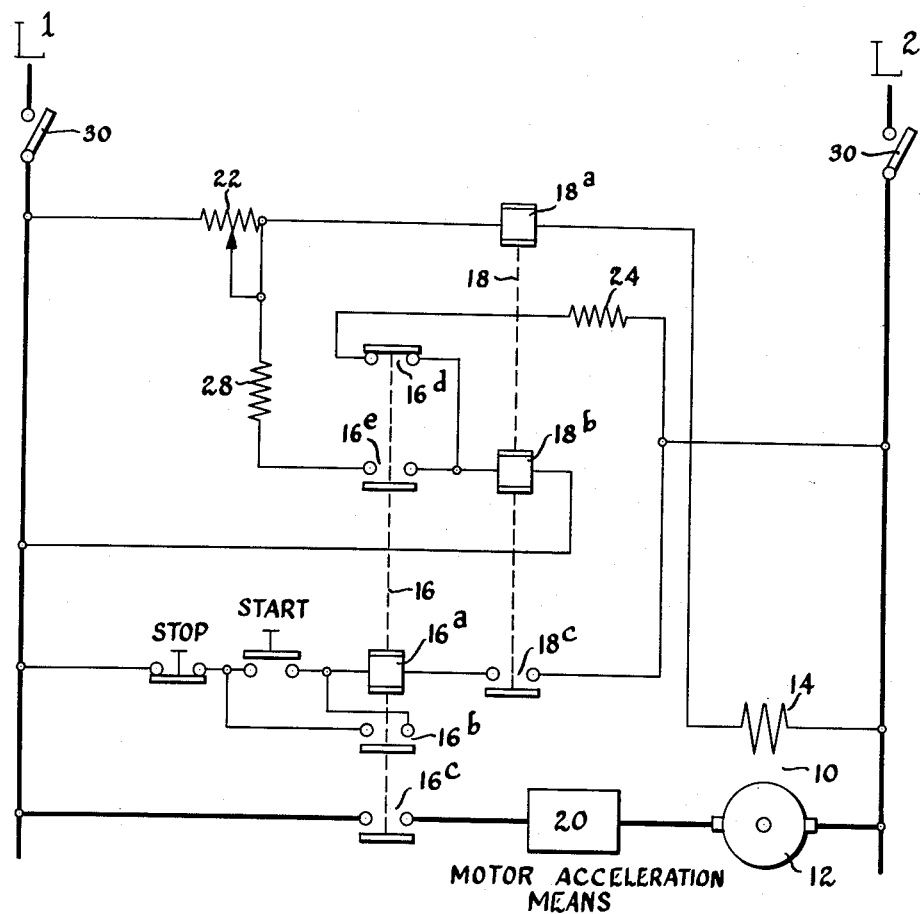
Inventors.
Robert N. Eck.
Fred D. Horner
By W. C. Lyon
Attorney.

United States Patent Office 2,725,513
Patented Nov. 29, 1955

2,725,513

PROTECTIVE SYSTEMS FOR DIRECT CURRENT MOTORS

Robert N. Eck, Whitefish Bay, Wis., and Fred S. Horner, Overbrook Hills, Pa., assignors to Cutler-Hammer, Inc., Milwaukee, Wis., a corporation of Delaware Application March 6, 1953, Serial No. 340,868

7 Claims. (Cl. 318—272)

This invention relates to a protective system for direct current motors, and more particularly to a system for protecting such motors and their drives against overspeeding resulting from reduction or interruption of the current flowing in the field windings of the motors.

The speed of direct current motors having shunt connected field windings may be adjusted over a wide range by adjusting the current supplied to such windings. It is common to protect such a motor against overspeeding resulting from interruption of its field current by providing an electromagnetic contactor having its energizing winding connected in series with the field winding and having its contacts connected in the control circuit of the main motor contactors. Such protective contactors are adjusted to be actuated when the current in their operating windings (the field current of the motor) falls below a predetermined magnitude. However, if the speed of the motor is to be adjusted by changing its field current, the contactor must be so adjusted that it will not operate unless the field current falls below that value of field current corresponding to the highest speed to which the motor is to be capable of being adjusted.

The overspeed protection provided by systems of this type is inadequate in applications where the motor speed is required to be adjustable over a wide range and where, for given speed adjustments less than that corresponding to the maximum speed of the required speed range, the maximum permissible speed is less than the maximum speed of such speed range.

An example of such an application is found in the motor drive for large grinding wheels. Grinding wheels are usually required to be operated at a fixed peripheral speed and it is therefore necessary, as the wheel wears down, to increase the motor speed. The maximum motor speed, which is required when the wheel is worn, may be several times greater than the minimum motor speed which is required when the wheel is new. However, because of the greater centrifugal force developed by a large wheel, it is unsafe to permit a new wheel of large diameter to rotate at the speed at which the used, smaller diameter wheel must be driven.

Accordingly, an object of this invention is to provide an improved system for the protection of direct current adjustable speed motors and their drives against overspeeding.

Another object is to provide a protective system for direct current motors which permits speed control of the motor by adjustment of its field winding current while providing protection against overspeeds resulting from the reduction of such current from a given preset value to a lower value within the current range required for speed adjustment and which lower value corresponds to the maximum safe speed of the connected load.

A more specific object of the invention is to provide an improved system for protecting grinding wheel drives and the like against overspeeding.

Other objects and advantages of the invention will hereinafter appear.

These objects are attained by the provision of electromagnetic means for interrupting the power connections to the motor and acting in response to both the current in the field winding of the motor and the adjustment of the speed adjusting means for the motor. Since the magnitude of the field current is decreased when the speed adjustment is increased, the combined effect of field current and speed adjustment upon the electromagnetic means is substantially constant regardless of the speed adjustment. If, however, the field current should for any reason be decreased while the speed adjustment remains unchanged, their combined effect would diminish. Such diminution of their combined effect is used to cause interruption of the power connections to the motor.

The novel features which are considered characteristic of the invention are set forth with particularity in the appended claims. The invention itself, however, both as to its organization and its method of operation together with additional objects and advantages thereof will be best understood from the following description of a specific embodiment when read in connection with the accompanying drawing, in which the single figure is a simplified circuit diagram of an overspeed protective system embodying the invention.

Referring to the drawing, the motor 10 comprises an armature 12 and a shunt field winding 14 for connection to a source of direct current power such as supply lines $L^1$ and $L^2$. The starting means (not shown) for the motor 10 may be of any well known type, including starting and stopping devices, accelerating resistors, and contactors appropriate to the size of said motor and to the characteristics of the motor load; and a main contactor for connecting the motor to the power source. The simplified starter selected for illustration comprises a Stop button having normally closed contacts, a Start button having normally open contacts, an operating winding $16^a$ and normally open contacts $16^b$ and $16^c$ of a main contactor 16; normally open contacts $18^c$ of a protective contactor 18; and a known form of motor accelerating means 20 which is shown in block form for simplicity. The Stop button contacts, the Start button contacts, operating winding $16^a$ and contacts $18^c$ are connected in series circuit relation across supply lines $L^1$ and $L^2$. Contacts $16^b$ are connected to bridge the contacts of the Start button and to maintain the circuit through operating winding $16^a$ when the start button is released. Contacts $16^c$ and motor accelerating means 20 are connected in series circuit relation with armature 12 across supply lines $L^1$ and $L^2$.

The shunt field winding 14 of the motor 10 is connected in series circuit relation with a first operating winding $18^a$ of contactor 18 and a speed control rheostat 22.

A second operating winding $18^b$ of contactor 18 is connected across the supply lines $L^1$ and $L^2$ through a current limiting resistor 24 and normally closed contacts $16^d$ of contactor 16. When operating winding $16^a$ is energized, contacts $16^d$ are opened and operating winding $18^b$ is reconnected in shunt circuit relation with rheostat 22 through normally open contacts $16^e$ of contactor 16 and a current limiting resistor 28.

Operating windings $18^a$ and $18^b$ are connected in such manner that they aid one another, but their combined holding effect is normally only a small amount greater than that required to hold contacts $18^c$ closed. Therefore, to provide a greater force for closing contacts $18^c$ and to insure proper starting operation of the motor, operating winding $18^b$ is initially connected across the supply lines through contacts $16^d$. When knife switch 30 is closed a current of relatively large magnitude flows through operating winding $18^b$ thereby effecting closure of contacts 18ᶜ. When the Start button is depressed, current flows through operating winding 16ᵃ. Thereupon, contacts 16ᵈ and 16ᵉ are opened and closed, respectively, to reconnect operating winding 18ᵇ in shunt circuit arrangement with rheostat 22; and contacts 16ᶜ are simultaneously closed to permit normal acceleration of motor 10 by the accelerating means 20. Also contacts 16ᵇ are closed to bridge the contacts of the Start button.

The starting operation of the system thus having been completed, operating winding 18ᵃ is energized by the shunt field current and exerts a force proportional in magnitude to such current. Operating winding 18ᵇ exerts a force which aids that exerted by operating winding 18ᵃ since its energizing current is proportional to the voltage drop across rheostat 22 which voltage drop is directly proportional to the resistance adjustment of rheostat 22. For example, if rheostat 22 is adjusted to increase its effective resistance the shunt field current will decrease and the speed of motor 10 will increase. Also the energization of operating winding 18ᵃ and its holding force will be decreased. However, the voltage across rheostat 22 will increase and will effect an increase in the energization and holding force of operating winding 18ᵇ. The sum of the respective holding forces exerted by operating windings 18ᵃ and 18ᵇ will remain substantially unchanged. Conversely, if rheostat 22 is adjusted to decrease its resistance the motor speed will decrease and the holding force of operating winding 18ᵇ will decrease; but the holding force of operating winding 18ᵃ will increase to maintain the total holding force substantially constant. Thus the motor speed may be varied without material change in the total force which maintains contact 18ᶜ closed.

If the shunt field current is interrupted or decreased by a fault in the shunt field circuit or by any cause other than adjustment of the field rheostat 22, the energization both of operating winding 18ᵃ and of operating winding 18ᵇ is decreased. Accordingly, their respective holding forces are decreased and contacts 18ᶜ are opened. Upon the opening of contacts 18ᶜ, operating winding 16ᵃ is de-energized and contacts 16ᶜ open to interrupt the power connections to the motor. Contactor 18 may be adjusted to open its contacts 18ᶜ when the field winding current falls in magnitude an amount corresponding to only a small fraction of the total change in such current which is required for operation over the total speed range of the motor. This is possible since adjustment of the speed control rheostat 22 changes the ratio of the holding forces exerted by operating windings 18ᵃ and 18ᵇ respectively, but does not vary substantially the sum of such holding forces. Faults in the field circuit, however, will result in a reduction of the sum of the holding forces so that contacts 18ᶜ will open to de-energize the main contactor operating winding 16ᵃ.

Thus, whereas the speed of motor 10 may be varied by several hundred percent of the rated motor speed by adjustment of rheostat 22 to vary the current in the shunt field winding, the motor will be de-energized if, as a result of a fault causing a reduction of the shunt field winding current, its speed increases only a small percentage above the speed corresponding to any given adjustment of rheostat 22.

The percentage of speed increase above the speed corresponding to the adjustment of rheostat 22, which is permitted without interruption of the power connections to armature 12, may be adjusted by adjusting contactor 18 in a manner to change the force required to hold its contacts 18ᶜ closed.

Contacts 18ᶜ may be connected at other points in the motor starter circuit. The only requirement for such connection is that the armature circuit be interrupted when the protective contactor 18 operates its contacts 18ᶜ in response to overspeed conditions. Moreover, contacts 16ᵈ and 16ᵉ need not form a part of the main contactor 16. They must, however, be operated when the main contactor is closed or shortly thereafter.

Thus, although we have shown a single embodiment of the invention it is to be understood that the invention is susceptible of embodiment in other forms without departing from the spirit of the invention or the scope of the appended claims.

We claim:

1. In an over-speed protective system for a direct current motor having a speed inversely proportional to the magnitude of its field current, in combination, means to supply current to the motor field including current adjusting means to be set for any one of a plurality of motor speeds, means to supply current to the motor armature and to afford a medium for interruption of armature supply, and electro responsive means having two control circuits, one affording a current increasing with increase in motor field current and the other affording a current decreasing with increase in motor field current, said electroresponsive means controlling said means to supply current to the motor armature and being sensitive to the magnitudes of the currents of said two circuits for effecting interruption of the armature supply at any of a plurality of settings of said field current adjusting means if and when the combined magnitude of the currents of said two circuits undergoes a predetermined change in magnitude.

2. In a protective system for direct current motors of the type having a field winding for connection to a direct current source of supply, means to vary the voltage applied to said field winding for speed control of said motor, and electromagnetic means for interrupting the power supplied to said motor, said last mentioned means comprising an operating winding having a portion for connection in series circuit with said field winding and said first mentioned means and a portion connected in shunt circuit with said first mentioned means.

3. In combination, an electric motor having an armature and a shunt field winding for connection to a direct current source of supply, a variable resistor, and electromagnetic means for interrupting the power supplied to said motor, said means comprising an operating winding having a first portion connected in series circuit with said shunt field winding and said variable resistor and a second portion connected in shunt circuit with said variable resistor.

4. In a protective system for direct current motors of the type having an armature and a field winding for connection to a direct current source of supply, an adjustable impedance device for connection between said field winding and said source of supply, and an electromagnetic device having a first operating winding connected in series circuit with said variable impedance device and a second operating winding connected in parallel with said adjustable impedance device to aid said first operating winding, said electromagnetic device further comprising contacts operated by said operating windings to interrupt the power supplied to said armature.

5. The combination defined by claim 4, including a second electromagnetic contactor having an operating winding connected in series with said first mentioned contacts and having normally open contacts for connecting said second operating winding in shunt circuit with said adjustable impedance device, said second electromagnetic contactor further having normally closed contacts for connecting said second operating winding to said direct current source of supply.

6. In combination, an electric motor having an armature and a shunt field winding for connection to a direct current source of supply, a variable resistor, a first contactor having a first operating winding connected in series circuit with said variable resistor and said shunt field winding, a second operating winding connected in parallel circuit with said variable resistor, and having a normally open contact, a second contactor having an operating winding connected in series circuit with said normally open contact of said first contactor and having a first normally open contact connected in series circuit with said variable resistor and said second operating winding of said first contactor, said second contactor also having a second normally open contact connected in series circuit with said armature and a normally closed contact connected in series circuit with said first shunt winding for connection to said direct current source of supply.

7. For a drive required to be driven at preselected speeds within a given speed range and driven by an electric motor having an armature and switch means in the power circuit of said armature and having a field winding and a variable resistor connected in circuit therewith for speed adjustment of said motor, a system for protecting said drive against substantial overspeeding beyond said preselected speeds, comprising in combination, electro-responsive means de-energizable to effect actuation of said switch means, and means responsive to a preselected joint effect of the current in said field winding and the voltage across said variable resistor and operative to effect de-energization of said first mentioned means.

References Cited in the file of this patent
UNITED STATES PATENTS

| | | |
|---|---|---|
| 1,551,400 | Jones | Aug. 25, 1925 |
| 1,787,278 | Lum | Dec. 30, 1930 |
| 1,861,149 | Wood | May 31, 1932 |
| 1,886,773 | Winne | Nov. 8, 1932 |
| 2,057,909 | Newman | Oct. 20, 1936 |
| 2,149,485 | Wood | Mar. 7, 1939 |